Feb. 15, 1949.  R. LO VICO  2,461,557
PRESET PRESSURE CAN FOR FROZEN FOODS OR THE LIKE
Filed April 17, 1944
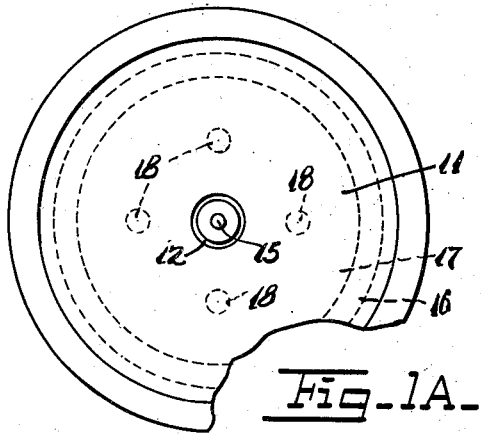
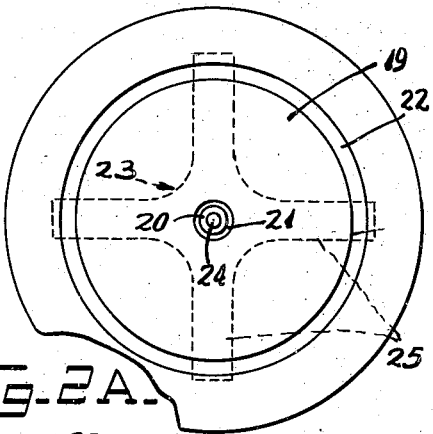
Fig-1A.    Fig-2A.
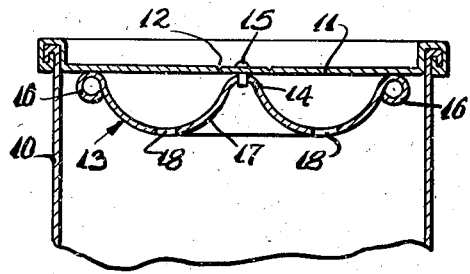
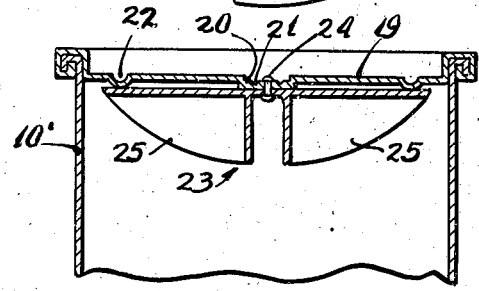
Fig-1.    Fig-2.
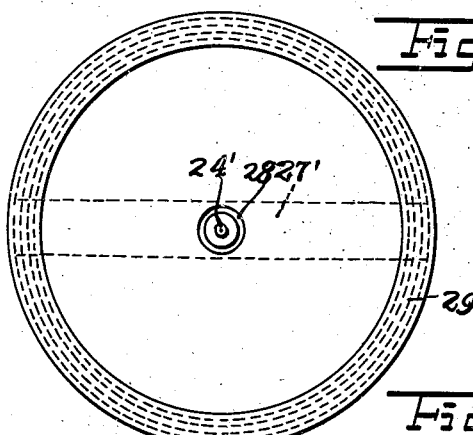
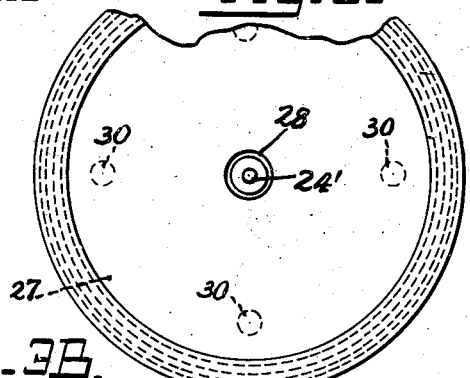
Fig-3B.
Fig-3A.
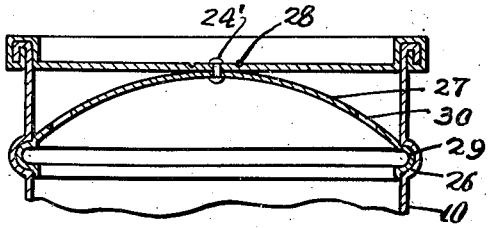
Fig-3.
INVENTOR.
Rosario Lo Vico
BY
*Jottau A. Polachek*
ATTORNEY Patented Feb. 15, 1949

2,461,557

UNITED STATES PATENT OFFICE 2,461,557

PRESET PRESSURE CAN FOR FROZEN FOODS OR THE LIKE

Rosario Lo Vico, Astoria, Long Island, N. Y.

Application April 17, 1944, Serial No. 531,462

5 Claims. (Cl. 220—89)

1

This invention relates to new and useful improvements in a pre-set pressure can for frozen foods or the like.

The invention proposes a construction of a can as mentioned which is characterized by a can intended to be hermetically sealed and having a wall sealing the can and means for puncturing the sealing wall when the pressure in the sealed can increases a predetermined amount.

The invention is particularly intended for cans in which frozen food is packed. Such frozen foods produce gases which reach pressures above five pounds per square inch when they spoil due to decomposition, changes in temperature, or other causes. The feature of the invention resides in the fact that a person may examine the can before using, and if the seal has been punctured by the means, it is known that the canned food should not be used.

Still further the invention proposes novel construction for providing tell-tale punctures for the purpose mentioned above.

Still further the invention proposes to provide means disposed within the can for tell-tale puncturing the sealing walls when the pressure in the can exceeds a predetermined amount.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary vertical central sectional view of a pre-set pressure can for frozen foods constructed in accordance with this invention.

Fig. 1A is a fragmentary plan view of Fig. 1.

Fig. 2 is a view similar to Fig. 1 of a can constructed in accordance with another form of this invention.

Fig. 2A is a fragmentary plan view of Fig. 2.

Fig. 3 is a view similar to Fig. 1 of a can constructed in accordance with another form of this invention.

Fig. 3A is a plan view of the can shown in Fig. 3.

Fig. 3B is a fragmentary plan view of a can constructed in accordance with another form of this invention.

The pre-set pressure can for frozen foods or the like, shown in Fig. 1, according to this invention, includes a can 10 intended to be hermetically sealed and having a sealing wall 11 provided with an annular score 12 at its center, the score being cut relatively deeply into the upper face of the wall 11. An annular member 13 is disposed inside the can. Member 13 has a cone-shaped portion 14 at its axis in engagement with the scored area of wall 11 and secured thereto by a hermetically sealed rivet 15, and a ring-shaped portion 16, cylindrical and hollow in cross section in engagement with the wall 11 adjacent its outer margin. Portions 14 and 16 are connected by an annular portion 17 semispherical in cross section, all as is clearly shown in Fig. 1. Four equally spaced holes 18 (two being shown in Fig. 1) are provided in the portion 17.

The operation of this form of the invention is as follows:

Should the contents of the can spoil, the pressure in the can will increase, and by way of the holes 18, will exert a bending force on the wall 11 tending to dome or bowl it upwards. However, as the center of the wall 11 is anchored to the member 13 by the rivet 15 and as member 13 forms a bridge having its base adjacent the margin of wall 11 at a point where the wall 11 is inherently strong and able to resist bowling, only the portion of wall 11 adjacent the scored area will bowl upwardly, which will result in breaking the wall through the score 12.

Consequently, if the contents of the can spoil, a tell-tale puncture at score 12 will occur and be visible so that the person purchasing the can will know that its contents are not usable or salable. Thus a storekeeper can tell at a glance whether a particular can of frozen goods is in good condition at the time that he sells it to his customer.

In Figs. 2 and 2A a modified form of the invention has been disclosed which distinguishes from the prior form in the fact that the sealing wall 19 of the can 10' has a depressed center portion 20 in which the score 21 is provided and has an annular depressed rim 22 adjacent its margin. A forged member 23 is secured to the scored area by a rivet 24. The forged member 23 is in the form of a spider having four legs 25 each of which is channel-shaped in cross section. Each leg at its extremity engages the rim 22. The operation of this embodiment of the invention is similar to the operation of the can 10.

In Figs. 3 and 3A another modified form of the invention has been disclosed which distinguishes from the prior form of Fig. 1 in the fact that the side wall of the can is provided with an annular groove 26, and an inverted bowl shaped member 27 is disposed in the can, secured to the scored area 28 by a rivet 24' and having an annular rim 29 disposed in groove 26. Member 27 is provided with a plurality of holes 30 similar to the holes 18 of can 10. The operation of this embodiment of the invention is similar to the operation of the can 10.

In Fig. 3B another modified form of the invention has been disclosed which, in section, would appear like the structure shown in Fig. 3, and similar parts are designated by like references with an accent added. Instead of employing a bowl shaped member 27 as in Fig. 3 an arched strip member 27' is employed.

It is to be understood that the scored lines used in this device may be in the form of grooves, or the like and they may describe a circular, triangular or any other geometrical or irregular area.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A pre-set pressure can having a can body with an end hermetically sealed by means of a wall which flexes in the presence of excessive pressure in the can and having a score line of considerable depth with respect to the thickness of said wall, dividing off an area, said scored area being substantially concentric with respect to the edge of said wall, a relatively unyielding wall-rupturing member transversely disposed in the interior of said can body, extended across the inner side of said wall and having a center portion secured to the center of said scored area with means securing the peripheral edge portion of said wall rupturing member against outward movement so as to cause shearing action between said area and the outer portion surrounding said area when the pressure in said can body increases and moves said wall at its portion surrounding said scored area away from said member.

2. A pre-set pressure can having a can body with an end hermetically sealed by means of a wall, having a score line of considerable depth with respect to the thickness of said wall, dividing off an area, said scored area being substantially concentric with respect to the edge of said wall, a member in the interior of said can body, extended across the inner side of said wall and engaging said wall adjacent the margin thereof, said member having a center portion secured to the center of said area so as to cause a shearing action between said area and the outer portion surrounding said area when the pressure in said can body increases and moves said wall at its portion surrounding said scored area away from said member.

3. A pre-set pressure can having a can body with an end hermetically sealed by means of a wall, having a score line of considerable depth with respect to the thickness of said wall, dividing off an area, said scored area being substantially concentric with respect to the edge of said wall, a circular member in the interior of said can body, extended across the inner side of said wall and having an upwardly bent outer edge which engages said wall adjacent the margin thereof, said member having a center portion secured to the center of said area so as to cause a shearing action between said area and the outer portion surrounding said area when the pressure in said can body increases and moves said wall at its portion surrounding said scored area away from said member.

4. A pre-set pressure can having a can body with an end hermetically sealed by means of a wall, having a score line of considerable depth with respect to the thickness of said wall, dividing off an area, said scored area being substantially concentric with respect to the edge of said wall, a member in the interior of said can body, extended across the inner side of said wall and engaging said wall adjacent the margin thereof, said member having a center portion secured to the center of said area so as to cause shearing action between said area and the outer portion surrounding said area when the pressure in said can body increases and moves said wall at its portion surrounding said area away from said member, said member being of spider form and having a plurality of channel shaped legs which engage said rim.

5. A pre-set pressure can having a can body with an end hermetically sealed by means of a wall, having a score line of considerable depth with respect to the thickness of said wall, dividing off an area, said scored area being substantially concentric with respect to the edge of said wall, a member in the interior of said can body, extended across the inner side of said wall, said member having a center portion secured to the center of said area so as to cause a shearing action between said area and the outer portion surrounding said area when the pressure in said can body increases and moves said wall at its portion surrounding said scored area away from said member, said member being of inverted bowl shape and being attached at its outer edge to the body of said can.

ROSARIO LO VICO.

REFERENCES CITED

The following references are of record in the file of this patent:

UNITED STATES PATENTS

| Number | Name | Date |
|---|---|---|
| 766,778 | Stubbers | Aug. 2, 1904 |
| 860,743 | Haaker | July 23, 1907 |
| 1,858,280 | Resek | May 17, 1932 |
| 1,930,138 | Van Derhoef | Oct. 10, 1933 |
| 2,095,828 | Nerad | Oct. 12, 1937 |
| 2,222,703 | Bixler | Nov. 26, 1940 |
| 2,291,374 | Canfield | July 28, 1942 |
| 2,296,848 | Gueffroy | Sept. 29, 1942 |
| 2,301,365 | Bushnell | Nov. 10, 1942 |
| 2,326,771 | Eidson | Aug. 17, 1943 |
| 2,336,490 | Lo Vico | Dec. 14, 1943 |

FOREIGN PATENTS

| Number | Country | Date |
|---|---|---|
| 315,236 | Italy | Feb. 20, 1934 |